(12) United States Patent
Klemm et al.

(10) Patent No.: US 7,722,740 B2
(45) Date of Patent: May 25, 2010

(54) METHOD FOR OBTAINING A GASEOUS PHASE FROM A LIQUID MEDIUM AND DEVICE FOR CARRYING OUT THE SAME

(75) Inventors: Elias Klemm, Nuremberg (DE); Johannes Albrecht, Woellstadt (DE); Armin Lange de Oliveira, Hanau (DE); Georg Markowz, Ostring (DE); Stefan Gross, Langenselbold (DE); Ruediger Schuette, Alzenau (DE); Johannes Ehrlich, Alzenau (DE); Steffen Schirrmeister, Muelheim an der Ruhr (DE); Olaf von Morstein, Essen (DE)

(73) Assignees: UHDE GmbH, Dortmund (DE); Degussa AG, Duesseldorf (DE)

( * ) Notice: Subject to any disclaimer, the term of this patent is extended or adjusted under 35 U.S.C. 154(b) by 1240 days.

(21) Appl. No.: 10/531,609

(22) PCT Filed: Oct. 14, 2003

(86) PCT No.: PCT/EP03/11328

§ 371 (c)(1),
(2), (4) Date: Nov. 1, 2005

(87) PCT Pub. No.: WO2004/036137

PCT Pub. Date: Apr. 29, 2004

(65) Prior Publication Data

US 2006/0060305 A1 Mar. 23, 2006

(30) Foreign Application Priority Data

Oct. 17, 2002 (DE) ................................ 102 48 599

(51) Int. Cl.
*B01D 1/22* (2006.01)
(52) U.S. Cl. ........................ 159/49; 159/28.6; 165/133; 165/167
(58) Field of Classification Search ................. 159/28.6, 159/49; 165/133, 167
See application file for complete search history.

(56) References Cited

U.S. PATENT DOCUMENTS

| | | | |
|---|---|---|---|
| 3,503,712 A | 3/1970 | Sussman | |
| 4,706,741 A | 11/1987 | Bolmstedt et al. | |
| 5,203,406 A | 4/1993 | Blomgren et al. | |
| 5,534,328 A | 7/1996 | Ashmead et al. | |
| 5,690,763 A | 11/1997 | Ashmead et al. | |
| 5,811,062 A | 9/1998 | Wegeng et al. | |
| 6,173,762 B1 | 1/2001 | Ishida et al. | |
| 6,220,497 B1 | 4/2001 | Benz et al. | |
| 6,321,998 B1 | 11/2001 | Schubert et al. | |
| 6,428,758 B1 | 8/2002 | Schuessler et al. | |
| 2004/0156762 A1 | 8/2004 | Schuppich et al. | |

FOREIGN PATENT DOCUMENTS

| | | |
|---|---|---|
| DE | 1 667 241 | 6/1971 |
| DE | 246 257 A1 | 6/1987 |
| DE | 195 41 265 A1 | 5/1997 |
| DE | 100 36 602 A1 | 2/2002 |
| DE | 101 62 801 A1 | 7/2003 |
| EP | 0 688 242 B1 | 12/1995 |
| EP | 0 878 442 B1 | 11/1998 |
| WO | WO 03/076065 A1 | 9/2003 |

*Primary Examiner*—Janet L Andres
*Assistant Examiner*—David E Gallis
(74) *Attorney, Agent, or Firm*—Marshall & Melhorn, LLC

(57) ABSTRACT

A modular construction micro-reactor with parallel microchannels on fluid guide plates for chemical reactions, but not for evaporation purposes is known. A modular construction falling film evaporator is disclosed, comprising a stack of alternate gap-like evaporation chambers and sheet-like evaporator modules with an assembly of parallel microchannels, whereby the evaporation chambers are open above and/or below across the whole width of the module and the stack is arranged in a container. The falling film evaporator is used in a method for obtaining a gaseous phase from a liquid medium on a technical scale and is suitable for the concentration of thermolabile solutions and rapidly adjustable production of a gas stream.

4 Claims, 5 Drawing Sheets

METHOD FOR OBTAINING A GASEOUS PHASE FROM A LIQUID MEDIUM AND DEVICE FOR CARRYING OUT THE SAME

BACKGROUND OF THE INVENTION

The invention relates to a process for the recovery of a gaseous phase from a liquid fluid by at least partial evaporation of the liquid fluid or at least one of the components contained therein or by setting free a component formed by decomposition. The process is implemented in a modular falling-film evaporator comprising stacked vertical or inclined plate-type modules that form gap-type evaporation chambers between the adjacent modules.

The device according to the invention is a reactor that can be operated on an industrial scale, especially on a scale in terms of tonnes.

Falling-film evaporators, which can be designed in the form of vertical tube bundles or vertical plate stacks, have manifold uses in the chemical processing industries. The advantage of falling-film evaporators as compared to conventional forced-circulation or natural-circulation evaporators is the low superheating of the liquid. Whereas in the case of falling-film evaporators the liquid film flows over the surface exclusively by gravity—reference is made to a typical layout in U.S. Pat. No. 5,203,406—thin-film evaporators are used for especially thermolabile substances, mechanical means being employed to create a thin film on the evaporator surface, the mass and heat transfer being improved by turbulence in the film—U.S. Pat. No. 6,173,762 being referred to as an example. The following examples for the application of falling-film evaporators can be cited: Removal of organic solvents from solutions in order to enrich the thermolabile products dissolved therein and to recover the solvent; concentration of fruit juices (food industry); winning fresh water from salt water or brackish water.

The falling-film evaporator according to U.S. Pat. No. 5,203,406 comprises a package of essentially vertically arranged heat exchanger plates spaced apart by a definite distance, every second space between the said plates forming an evaporation chamber. The structuring of the evaporator plates cannot be deduced from this document.

It is known from U.S. Pat. No. 6,173,762 B1 to structure the film-wetted surface of a heat exchanger tube with fins and grooves for the purpose of improving the heat and mass transfer. The height of the fins is specified as 0.2 mm to 0.8 mm, and the number of fins is specified as 900 to 1100 per meter.

In conventional falling-film evaporators, the spraying density and film thickness may not fall below certain minima, namely around 1 mm in the case of falling-film evaporators and around 0.5 mm in the case of thin-film evaporators, because otherwise film interruptions, dry running and undesirable hot spots may occur, possibly resulting in undesirable decomposition phenomena when concentrating a liquid fluid that contains a thermolabile component.

DE 100 36 602 A1 teaches a modular micro-reactor for the performance of reactions between a liquid and a gaseous reactant. This micro-reactor comprises a stack of any number of vertical or slanted fluid guide plates, the same number of intermediate plates and gap-shaped reaction chambers formed between two adjacent plates. The fluid guide plates feature parallel micro-channels in which a liquid can flow by gravity and/or capillary forces in continuous capillary filaments and come in contact and react with a gas. The fluid guide plate can be coated with a catalyst and can come in contact with a heat transfer fluid on its reverse side. The reaction mixture that forms in the process is withdrawn at the lower end of the fluid guide plates via collecting channels. The disadvantages of the micro-reactor according to DE 100 36 602 A1 are the many feed and discharge lines, collecting and distribution channels, pressure loss barriers and special slopes and the resulting highly complicated technical construction. Although the modular construction can improve the throughput to a certain extent, no proposals are made in the document as to how the miniaturised reaction system has to be modified in order to make it economically suitable for commercial-scale applications. Proposals for using the micro-reactor as an evaporator cannot be deduced from the document.

WO 02/18042 A1 describes a further commercial-scale reactor for performing reactions between at least two fluid reactants. The reactor comprises a stack of essentially rectangular vertical wall elements with an integrated cooling device and gap-type reaction chambers between the adjacent wall elements. Although the wall elements can be structured and coated with a catalyst, nothing can be found in the document neither with regard to the structure consisting of a set of parallel micro-channels nor with regard to the reactor being usable as an evaporator.

DD patent 246 257 teaches a process micro-equipment consisting of a stack of individual small substrate plates with worked-in hollows, the small plates being covered to form closed channel-shaped cavities. This micro-reactor contains channel-type reaction chambers, in which not only chemical reactions but also evaporation processes can take place. Such a micro-reactor is suitable for use as a reaction vessel in chemical micro-analysis but not for use as an evaporator for a commercial-scale process (in terms of tonnes).

DE published document 1 667 241 describes a reactor for chemical reactions comprising a stack of plate-type modules which may, if required, be coated with a catalyst and further comprising gap-type reaction chambers formed by the modules including spacers for delimiting the reaction chamber sizes and inlet and outlet devices. The spacing between the plates is in the order of 0.001 and 6.3 mm, so that the effective reaction chamber can be enlarged as compared with micro-reactors. The surface of the plates on which the liquid film flows by centrifugal force may be etched, but nothing can be found in the document with regard to the presence of parallel micro-channels. Although the plate stack can be temperature-controlled as a whole, nothing can be found in the document with regard to controlling the temperature of individual plates, so that this device is not directly suitable for commercial-scale use.

The reactor according to U.S. Pat. No. 5,811,062 comprises several laminates arranged above each other with microstructured elements therein, such as micro-channels in particular. By interconnecting a plurality of such micro-reactors, reactions can be performed on a macro scale. The dimensions of the micro-components are in the order of 1 μm to 1 cm. The width of the grooves in the laminates forming the channel covers is cited as being 1 μm to 1 mm; insofar as a gap is present above the grooves, the gap width is said to be less than 100 μm and especially less than 10 μm. Although the reactor can be used as an evaporator, nothing is contained in the document in the way of a concept to arrange the laminates with the micro-structures, i.e. the reaction channels, in any other way than vertically. The reactor is not used as a falling-film evaporator. Moreover, it is a disadvantage of this reactor that the size of the grooves is such that, even if there is a small space above the grooves, evaporation of a liquid flowing through the grooves is only possible within extremely narrow limits.

EP patent 0 688 242 teaches an integral structure for chemical processing and production comprising a plurality of interconnected small plates forming at least one three-dimensional continuous loop-type channel between adjacent plates and at least one inlet and outlet port for the substances to be circulated. This modular micro-reactor may also feature channels between adjacent plates for a heat-transfer fluid. This micro-reactor, too, is unsuitable to be enlarged indefinitely by connecting many reactors in parallel and/or by increasing the number of plates within a stack, in order to permit a process to take place on a commercial scale. No concepts can be derived from this document with regard to modifying the micro-reactor in such a way that it becomes suitable for the use as a falling-film evaporator.

SUMMARY OF THE INVENTION

It is thus the aim of the present invention to create an improved process for the recovery of a gaseous phase from a liquid fluid, using a modular falling-film evaporator containing stacked vertical or inclined plate-type modules and gap-type reaction chambers formed by the two adjacent modules, an essential aspect of the improvement being the ability to implement the process on an industrial scale (in terms of tonnes) in a simple and economical way.

A further aim of the invention is to provide an apparatus that is able to concentrate a liquid fluid containing a thermolabile component without appreciable decomposition and especially without the risk of an uncontrolled decomposition, it being possible to put the gaseous phase formed and the concentrated liquid phase to further processing.

A further aim is the ability to provide a gas, recovered by the evaporation of a liquid, at a constant pressure and quickly controllable for a secondary reaction with a second reaction component.

A further aim of the invention is the provision of a device for performing the process according to the invention on a commercial scale.

According to a further aim, the device is to be of the simplest possible construction and, in addition, it is to be easily adaptable to different capacity requirements.

According to a further aim, the device according to the invention must itself be suitable as a reactor for further conversion of the gas phase formed and/or the concentrating liquid phase by reacting with one or more further reactants.

The above-mentioned aims and further aims that are easily deducible from the following description are met by using a falling-film evaporator comprising a set of micro-channels arranged on the evaporator modules in an orientation suitable for a falling film and the evaporation chambers of which are gap-like and open at the top and/or at the bottom.

Thus, a commercial-scale process was found for the recovery of a gaseous phase from a liquid fluid by at least partial evaporation of the liquid fluid or at least one of the components contained therein or by setting free one of the components formed by decomposition of the liquid fluid in a modular falling-film evaporator that comprises stacked vertical or inclined plate-type modules, with at least every other module being designed as an evaporator module, and gap-type evaporation chambers formed by two mutually facing side surfaces of essentially equal-sized rectangular modules, characterised in that a falling-film evaporator is used, the evaporator modules of which feature a set of parallel micro-channels on a side facing the said evaporation chambers, the orientation of the micro-channels corresponding to the direction of flow of the liquid fluid flowing therein by gravity and/or capillary forces, and the evaporation chambers of which are open at the top and/or bottom essentially over the entire width of the module, the liquid fluid being fed to the micro-channels by a feeding device, the micro-channels being indirectly heated by a heat exchange fluid flowing through the evaporator modules, and the gaseous phase formed being withdrawn from the evaporation chambers that are open at the top and/or bottom.

The liquid fluid that is fed to the respective set of parallel micro-channels may be a pure substance or a mixture, e.g. a solution of one or several components in a solvent. The term "liquid fluid" includes melts. Under process conditions, which depend—as regards pressure and temperature—to a large extent on the thermo-physical properties of the liquid fluid, a gaseous phase is formed by at least partial evaporation of a component of the liquid fluid or by deliberate thermal transition of a component contained therein. The term gaseous phase includes vapours and mists.

Surprisingly, a reactor according to the invention which contains, analogously to the micro-reactor according to DE 100 36 602 A1, a fluid guide plate and gap-type reaction chambers, the said gaps, however, being open at the top and/or bottom essentially over the entire width, can be used for the evaporation of a liquid fluid. The above-mentioned document contains nothing to suggest this. Thanks to the particular features—described below—of the falling-film evaporator used in accordance with the invention, the process can be implemented on a commercial scale.

The terms falling-film evaporator, evaporator modules and evaporation chambers are used in the present invention despite the fact that the liquid fluid or a component contained therein is not evaporated in all cases, but that a component can be set free by deliberate thermal transition. Moreover, the term "falling-film evaporator" is used despite the fact that the liquid flowing over the evaporator modules does not take the form of a flat film but that of continuous capillary filaments flowing in parallel to each other. The structure of the evaporator surface with a set of open parallel micro-channels permits a significant increase in the spraying density and thickness of the capillary filaments as compared with a film flowing in conventional falling-film evaporators, thus increasing the mass and heat transfer coefficients significantly without disrupting the capillary filaments, without the evaporator running dry and without the formation of hot spots.

The type of falling-film evaporator used according to the invention is a modular falling-film evaporator containing plate-type evaporator modules, as a result of which it can be adapted to the desired evaporator capacity easily and with a small technical effort. In principle, the process according to the invention can be implemented in a falling-film evaporator comprising modules consisting of several concentric tubes, at least some of the annular spaces between the tubes being used as evaporation chambers and at least one tube wall of these evaporation chambers featuring a set of micro-channels. However, such a modular tubular falling-film evaporator is technically more complex than a plate-type evaporator and, moreover, it cannot be enlarged in as easy a manner as the modular falling-film evaporator used according to the invention, i.e. with stacked plate-type modules.

The gaseous phase that forms in the process described in the invention can be withdrawn from the evaporation chambers and then fed to further processing facilities. Alternatively, the recovered gaseous phase can be further converted directly in the evaporation chambers by reaction with a second gaseous reactant, which is fed into the evaporation chambers with or without the presence of a catalyst on at least part of the surfaces delimiting the evaporation chambers. The second gaseous reactant can be fed into the evaporation chambers in co-current or in counter-current to the flow direction of the liquid fluid. If the conversion of the gas formed in situ is catalysed heterogeneously with the second reactant fed to the evaporation chambers, it is advantageous to coat the sides of the evaporation chambers opposite the evaporator sides using an efficient catalyst.

According to a further embodiment of the invention, the gaseous phase forming in the evaporation chambers is removed as such or as partially reacted gas from the evaporation chambers by means of an inert or reactive gas fed to the evaporation chambers from the upper or lower side. Insofar as a chemical reaction already takes place within the evaporation chambers, the evaporation chambers are also reaction chambers.

The mixture of recovered gas and the inert or reactive gas can, for instance, be converted in a downstream reactor, especially a modular plate-type reactor.

The amount of the liquid fluid fed to the micro-channels will normally decrease whilst flowing through the micro-channels. Only if the concentrating liquid fluid reacts with a further gaseous reactant fed to the evaporation chambers can its volume remain essentially constant or increase. The liquid fluid leaving the micro-channels is either collected in a vessel arranged directly below the said chambers or withdrawn from the falling-film evaporator via a discharge duct.

The process according to the invention is particularly suitable for concentrating liquid fluids that contain one or more thermolabile compounds. The one or several thermolabile substances may be contained in liquid phase formed by concentration and/or in the gaseous or vapour phase formed by evaporation. For the purpose of concentrating such a fluid it may be particularly advantageous for the falling-film evaporator used to provide several stacks of vertical modules and interposed gap-type evaporation chambers with at least one set of parallel micro-channels per evaporation chamber. It is expedient for the stacks to be arranged above each other and for the gap-type spaces between the modules to be essentially open over the entire width at the top and bottom, so that a gas stream can essentially flow freely and without a pressure drop through these spaces and, in addition, the liquid emanating from the micro-channels of an upper stack can be fed to the micro-channels of the next lower stack.

As an alternative or in addition to using a falling-film evaporator comprising several stacks, a stack can be configured in such a manner that the evaporator modules are subdivided into several horizontal zones. The individual stacks or the individual zones of the evaporator modules of a stack can be operated with heat exchange fluids of different temperatures, thus permitting the individual stacks or individual zones to operate at different temperatures. Thus, when concentrating a liquid fluid containing a thermolabile component, it is particularly advantageous to use the first stack or the first zone for concentration and a downstream stack or zone for cooling the concentrate formed. In the spaces defined as being evaporation chambers of the falling-film evaporator used according to the invention, it is thus also possible to cool liquid fluids, despite the fact that the term evaporation chamber was retained.

BRIEF DESRCIPTION OF THE DRAWINGS

The process according to the invention and the falling-film evaporator used therefor are described in more detail with the aid of the following figures.

The meaning of the reference numbers in FIGS. 1 to 5 is shown in the legend.

DESCRIPTION OF THE PREFERRED EMBODIMENT

Figure 1:
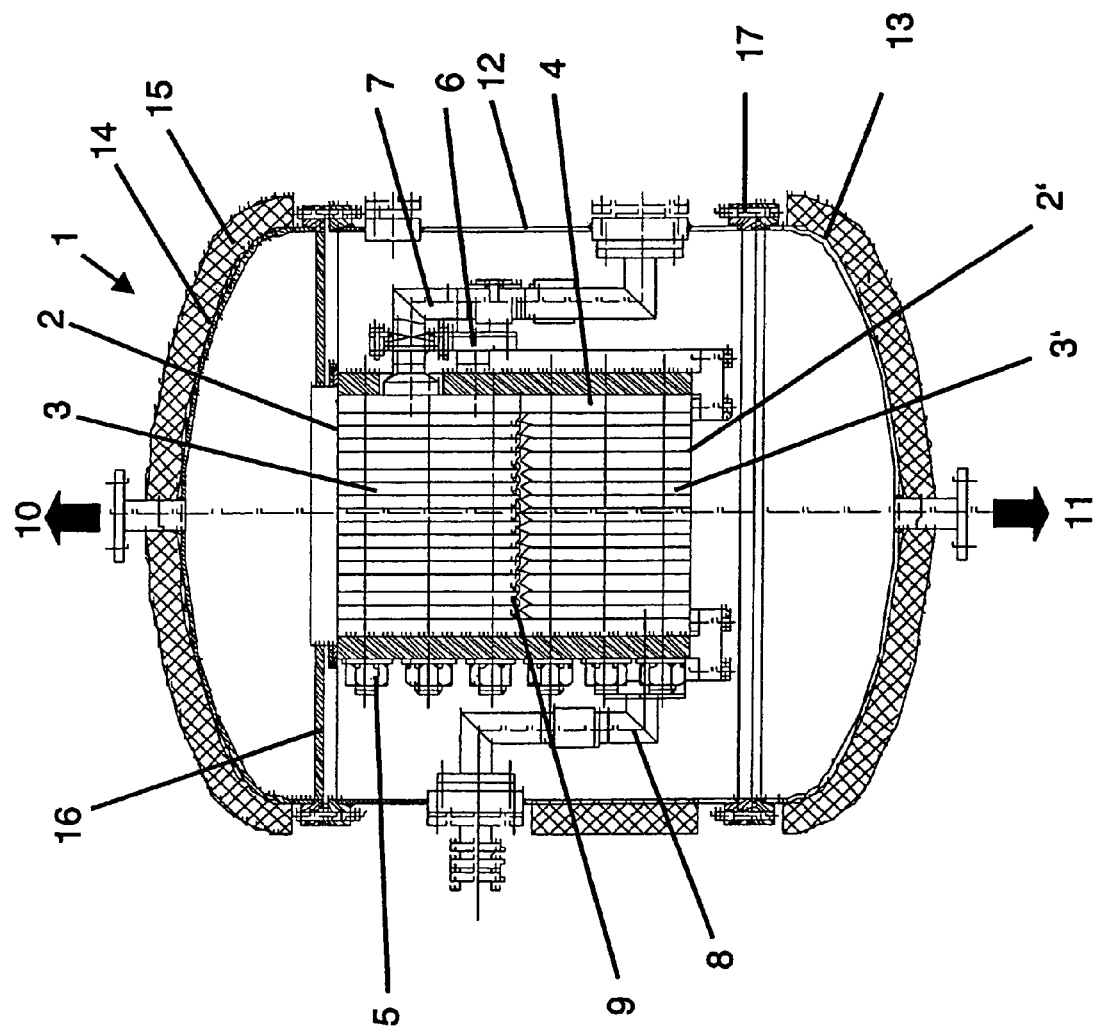
FIG. 1 shows the cross-section of a falling-film evaporator according to the invention with two stacks of evaporator or cooler modules arranged within a vessel, with the associated (but not discernible) intermediate spaces between the modules.

FIG. 1 shows a preferred construction of a falling-film evaporator (1) to be used according to the invention, such a falling-film evaporator being particularly suitable for the concentration of solutions which contain a thermolabile component. Two stacks (2, 2') of modules (3, 3') according to the invention with interposed gap-shaped chambers, which are, however, not discernible in FIG. 1, are fixed in a vessel by means of a fixing device which is not shown in the figure, the vessel comprising a vessel side wall (12), a vessel bottom (13) and a vessel cover (14). The vessel features a nozzle in the upper section for withdrawing the gaseous phase (gas, vapour or mist) (10) and a nozzle in the lower section for withdrawing a liquid phase (11). The vertically stacked plate-type modules of the two stacks are arranged immediately above each other, so that the orientation of the evaporation chambers of the upper stack essentially corresponds to those of the lower stack. The intermediate spaces between the modules are not discernible in FIG. 1, because their narrow sides are closed in this particular configuration. The term "essentially over the entire width" means that the gap may be interrupted by construction-dependent weld spots, spacers and the like. On the other hand, the gap-like chambers in both stacks are open over virtually the entire width of the modules both at the top and bottom, so that the gaseous phase that forms in the process according to the invention can escape quickly and without a complicated piping system downwards or upwards. In the configuration according to FIG. 1, a device (9) is arranged between the two stacks for feeding a gas into the gap-like evaporation chambers. By feeding an inert or a reactive gas at the lower end of a stack, it is ensured that the gaseous phase that forms in the evaporation chambers escapes in one direction only, in this particular case upwards. In order to prevent re-mixing of the gas phase expelled at the top from the evaporation chambers and re-entry into the lower part of the lowermost stack, a gas-tight partitioning element (16) is arranged between the vessel wall and the upper edge of the uppermost stack. This partitioning element may be of any construction, providing one ensures that re-mixing is prevented. It is possible, for instance, that the vessel cover is connected directly with the outer edge of the uppermost stack and the vessel bottom is connected directly with the lowermost stack and the outer sides of the plate stack represent the vessel wall.

The plate stacks comprise a plurality of evaporator modules (3) and evaporation chambers arranged between them. The gap width (s) between any two evaporator modules and the dimensional accuracy of the evaporation chambers is ensured by spacers (22) (see FIGS. 2 to 5). It is appropriate for end modules, which may consist of simple plates, to be provided on both sides of the plate stacks. The plate stack is fixed by means of any type of tensioning device, in FIG. 1 the tensioning device comprises stud bolts and nuts (5). FIG. 1 additionally features a line for the heating agent inlet (6), a line for the heating agent outlet (7) and a line for the coolant inlet (8) for the lowermost stack.

Figure 3:
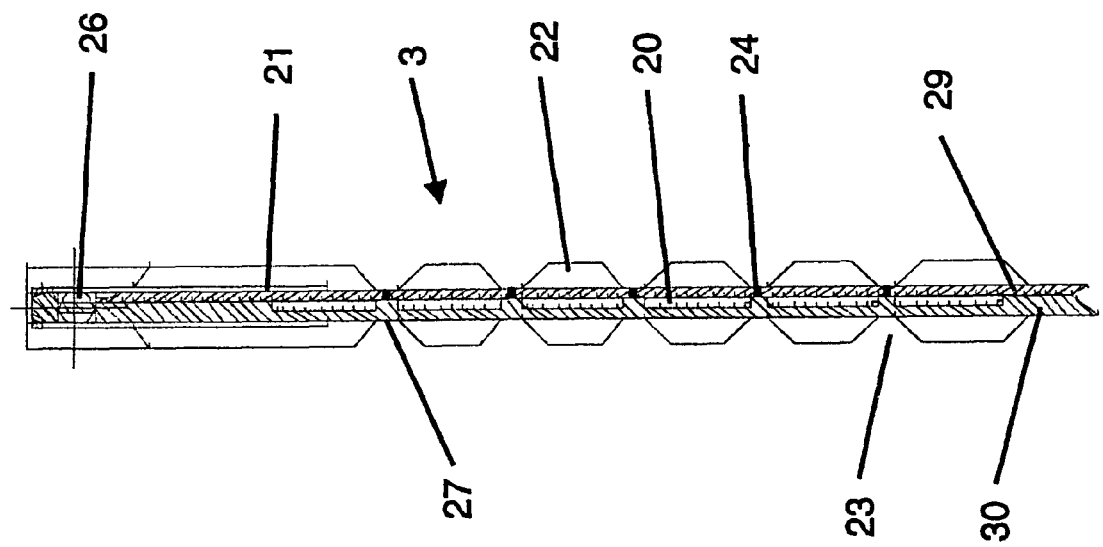
FIG. 3 shows the cross-section of an evaporator module along line A A' in FIG. 2.

The construction of an individual evaporator module with its required spacers is illustrated on the basis of FIG. 3: the module comprises the two plates (29) and (30) lying on top of each other with channels (20) for a heat transfer fluid. The stability of the plates is ensured by weld spots (24) and/or weld seams joining adjacent plates. Several spacers (22) are located on the outside of the plates; gaps (23) between the spacers permit the gas phase to transversely mix to both sides of the spacers which should expediently be arranged in vertical lines. Each outside surface (27) of the plates (29, 30) is equipped with a set of parallel micro-channels, these micro-channels normally extending over the entire plate height. The inlet line (26) for the liquid fluid is located at the upper end of the plates, the inlet line having ports (not shown) that are an integral part of the feeding device. This line and the uppermost part of the plates is provided with a cover plate (21) in a manner as to permit the liquid from line (26) to be fed into the micro-channels only.

Figure 4:
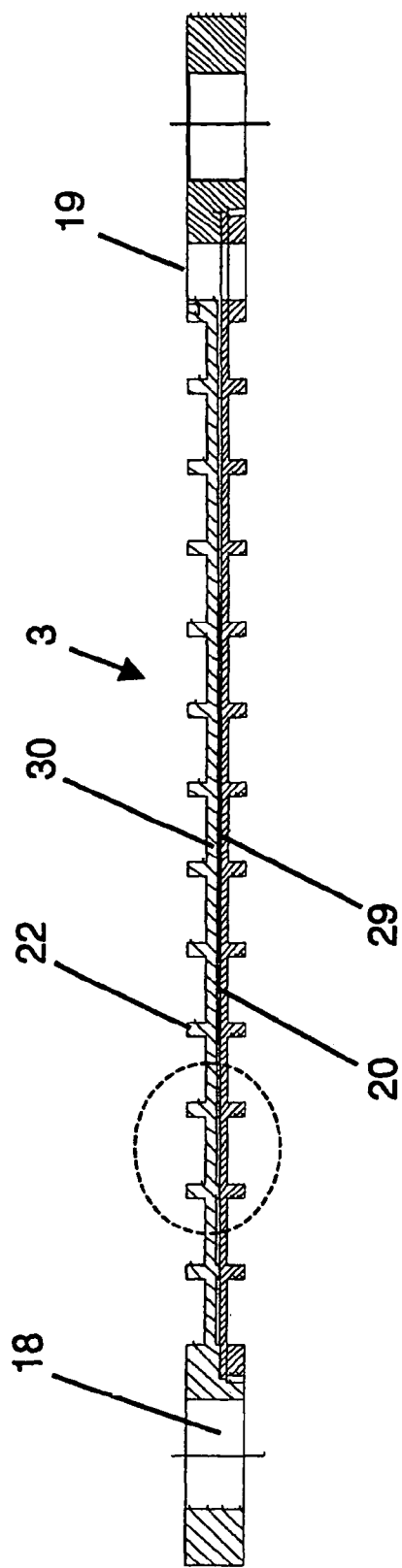
FIG. 4 shows the cross-section of an evaporator module along line B B' in FIG. 2.

The cross-section according to FIG. 4 elucidates the basic construction of an evaporator module consisting of two plates (29, 30) with the cavities for the heat transfer fluid (20), the spacers (22), a distribution line for the liquid fluid and the holes (18) for the stud bolts used for fixing the module package.

Figure 2:
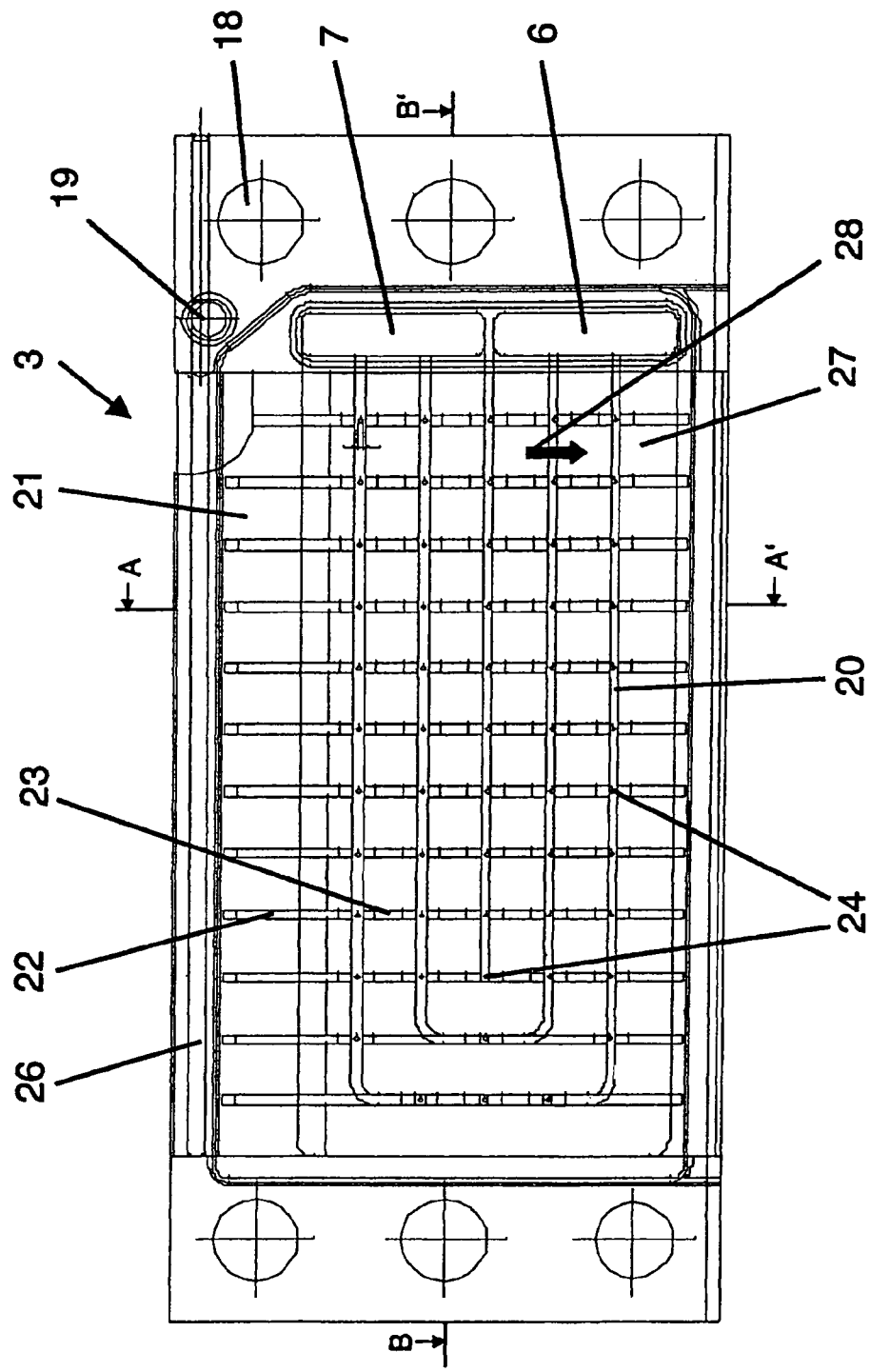
FIG. 2 shows the a plan view of an evaporator module.

FIG. 2 depicts a plan view of an evaporator plate (3). The arrangement of spacers shown, which are located vertically above each other spaced a certain distance apart, is particularly expedient. The sets of parallel micro-channels (not shown) are located in the fields between the spacers (27). The flow direction of the liquid in the micro-channels is shown by the arrow (28). FIG. 2 further shows (in broken lines) the heating agent inlet (6), the heating agent outlet (7) and some of the channels (20) for the heat exchange fluid within the plate. The feed device for the liquid fluid comprises the distribution line (19), the feed line (26) and the cover plate (21). Weld spots (24) and the holes (18) for stud bolts are also indicated in the figure.

Figure 5:
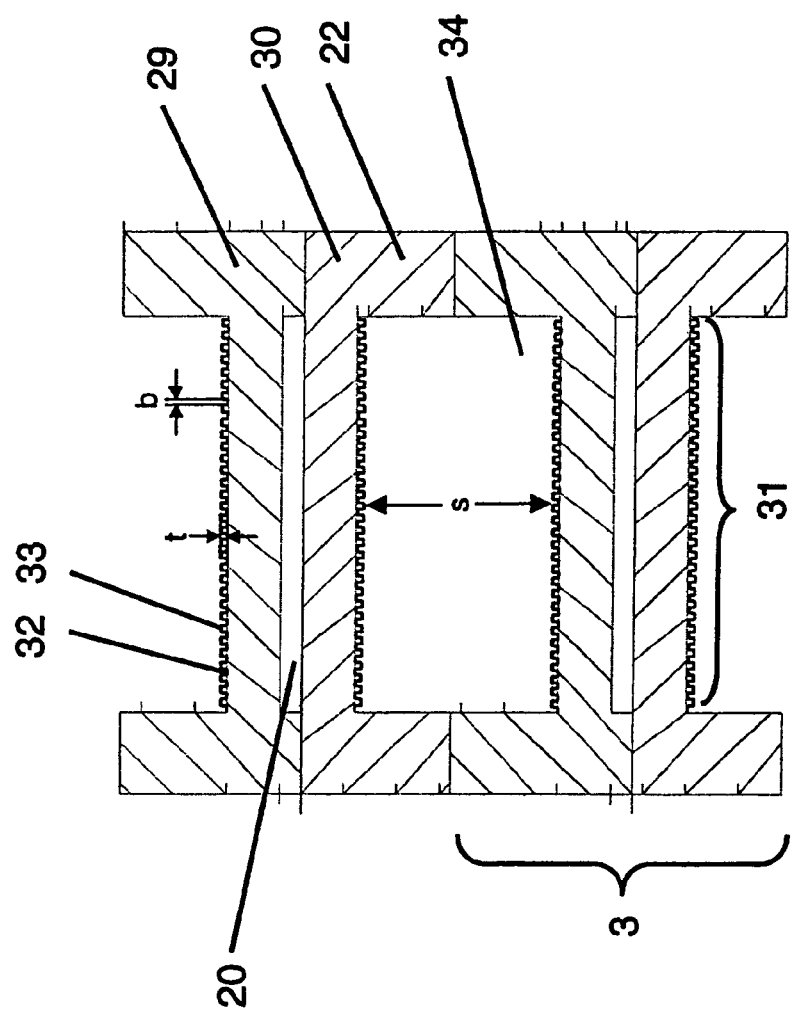
FIG. 5 shows an enlarged cross-section from FIG. 4 (enclosed by a circle), showing the respective detail of two adjacent evaporator modules and sets of parallel micro-channels.

FIG. 5 shows a detail of two adjacent evaporator modules (3). The gap width (s) of the evaporation chamber between two evaporator modules is determined by the height of the spacers (22). Sets (31) of parallel micro-channels (32), between which the webs (32, 33) are located can also be seen in FIG. 5. In addition, the depth (t) and width (b) of the micro-channels are shown. According to a preferred embodiment of the falling-film evaporator to be used according to the invention, the gap width (s), measured from the bottom of the micro-channels, is larger than the depth (t) of the micro-channels but smaller than 20 mm. Preferably, the gap width (s) is larger than 2 t, and especially larger than 5 t, preferably larger than 100 µm. The width b of the micro-channels can be within wide limits, but a width of less than 2000 µm is expedient, especially between 50 µm and 500 µm. The depth (t) of the micro-channels is usually less than 1000 µm, especially between 25 µm and 500 µm. The width of the webs between the micro-channels is less critical, but determines the maximum possible liquid throughput, so that it is advantageous for the web width to be less than 1000 µm, especially between 25 µm and 500 µm.

A further item of the invention is a suitable device for implementing the process in accordance with the device claims.

According to a particularly preferred embodiment of the invention, the evaporation chambers are closed at their narrow sides and open at the top and at the bottom over virtually the entire width of the modules.

The preferred construction of a falling-film evaporator according to the invention as shown in FIG. 1 may be modified in that, instead of the combination of two stacks of modules with gap-type chambers between the modules as shown in FIG. 1, a single module package is used, the cavities for the heat transfer fluid in the evaporator modules being arranged so as to obtain several horizontal zones. A separate heating agent inlet and outlet is provided for every zone, so that a step-wise temperature profile can be set across the evaporator modules.

According to another embodiment of a falling-film evaporator according to the invention, which comprises several stacks of evaporator modules with the associated gap-type evaporation chambers arranged between the modules, the stacks are installed in one or several vessels laterally off-set above each other. This particular construction is advantageous if a gaseous phase is recovered from a liquid fluid in the lowermost stack and this gaseous phase is made to react in the uppermost stack with a second reactant which may be gaseous and which is fed to the uppermost stack, the reaction product being liquid and leaves the lower end of the upper stack drop-wise and, consequently, does not mix with the liquid leaving the lower stack drop-wise. It goes without saying that the modules can, in this case, be coated with an effective catalyst. Although the use of modules with a set of parallel micro-channels is not always necessary in a second module package, it is nevertheless advantageous to equip the modules of the second stack with sets of parallel micro-channels if the second reactant is also a liquid and/or if a catalyst has to be present in a direct layer.

The process according to the invention concerns either a simple evaporation or the formation of a gaseous phase by thermal transition, or a combination of gaseous phase formation with subsequent reaction with a second reactant. This reaction may be any type of reaction, for instance oxidation, epoxidation, hydrogenation or addition reaction. The second reactant may be gaseous or liquid.

The device according to the invention provides the following advantages:

- Simpler construction than that of previously known modular micro-reactors with micro-channels on fluid guide plates, in that, by virtue of open gaps at the top and/or at the bottom between any two evaporator modules or between an evaporator module and an adjacent plate without micro-channels, no complex channel system is required for feeding gas to, and/or withdrawing liquid from, the reactor.
- Easy adaptability to a desired plant capacity by virtue of the modular construction; simple scale-up.
- Easy adaptability of the device to differing requirements for the further processing of the gas recovered in situ from a liquid by a combination of downstream identical or similar devices.
- Increased safety by virtue of gap-type evaporation chambers and short-term thermal load of the liquid to be evaporated and rapid cooling in a downstream zone or stack of an identical device operated at a lower temperature.
- Easy replacement of the modules which may have a catalytic coating on the walls. Moreover, the coating can also be applied to a set of parallel micro-channels, thus increasing the catalyst quantity required for a secondary catalytic reaction and improving the catalyst bonding strength which, consequently, produces a favourable effect on the reaction.

Easy variation of the gap width of the evaporation/reaction chambers by changing the size of the spacers between the modules.

Good controllability of the heat transfer and rapid response to changes in the feed rate; uniform temperature profile on the side surfaces of the evaporator modules and, consequently, avoidance of hot spots.

Low pressure drop as a result of gaps that are open at the top and/or at the bottom and by virtue of gap widths that are adapted to the quantity of gas formed.

Prevention of flame propagation by selecting an appropriate gap width in a modular evaporator serving for the recovery of a gaseous phase or in a downstream plate-type reactor.

Versatile usability of the device according to the invention or a combination thereof with identical or similar modular reactors for different reactions, such as oxidation and hydrogenation, it being possible to convert the oxidant or reduction agent, or the substrate to be oxidised or reduced, to the gaseous state required for the reaction in a device according to the invention. A preferred example for oxidation is the gas-phase epoxidation of a low olefin, such as ethylene, propylene, 2- and 4-butene with gaseous hydrogen peroxide. Examples of reduction agents to be converted to the gaseous phase are hydrazine and hydroxyl-amine.

An example for the use of the device according to the invention is the evaporation of an aqueous hydrogen peroxide solution for the purpose of obtaining (i) a concentrated aqueous hydrogen peroxide solution and (ii) and a vapour phase containing hydrogen peroxide and water which can, in turn, be fed directly to secondary reactions, such as the epoxidation of an olefin, such as propylene, in the gaseous phase.

A further example for the application of the process according to the invention is the provision of a gas stream recovered from a liquid, for instance an ammonia gas stream recovered from liquid ammonia, the gas stream being easily and quickly controllable, and customised utilisation of the gas stream in a chemical reaction. In contrast to conventional processes, which frequently result in pressure drops and which entail the risk of effervescence, the tailor-made provision under essentially constant pressure can be effected by controlling the heat input to the evaporator modules and/or by controlling the liquid feed, such as the liquid feed to a reduced or increased number of modules.

LEGEND

1 Falling-film evaporator
2 Stack (of evaporator modules and gap-shaped evaporation chambers)
2' Stack (of cooler modules and gap-shaped intermediate spaces)
3 Evaporator module
3' Cooler module
4 End module
5 Stud bolt with nut (tensioning device)
6 Heating agent inlet
7 Heating agent outlet
8 Coolant inlet
9 Gas feeding device
10 Gas outlet (gas, vapour)
11 Concentrate outlet
12 Vessel side wall
13 Vessel bottom
14 Vessel head
15 Insulation
16 Partitioning element
17 Flange
18 Hole for stud bolt
19 Distribution line (for liquid fluid)
20 Channel for heat transfer fluid
21 Cover plate (part of the feed device)
22 Spacer
23 Hole
24 Weld spot
25 Weld seam
26 Inlet line (for liquid fluid)
27 Plate surface (with micro-channels)
28 Direction of flow (liquid fluid)
29 Plates of a module
30 Plates of a module
31 Set of micro-channels
32 Micro-channel
33 Web between micro-channels
34 Evaporation chamber

The invention claimed is:

1. A device for the recovery of a gaseous phase from a liquid fluid on a commercial scale by at least partial evaporation of the liquid fluid or of at least one of the components contained therein or by setting free one of the components formed by thermal transition of the liquid fluid, said device comprising a modular falling-film evaporator consisting of stacked vertical or inclined plate-type modules, said device comprising a modular falling film evaporator containing at least one stack of vertical or inclined plate-type modules, at least every other module featuring one or several spaces through which a heat exchange fluid can flow, and gap-shaped evaporation chambers between the side surfaces of essentially equal-sized rectangular modules, with the surfaces facing each other, wherein the evaporator modules feature a set of parallel micro-channels on at least one side facing the gap-type evaporation chambers, the orientation of the micro-channels corresponding to the direction of the liquid fluid stream flowing therein by gravity and/or capillary forces, and a device for feeding a liquid fluid into the micro-channels, the gap-type evaporation chambers being open at the top and/or bottom essentially over the entire width of the module, and that at least one stack being arranged in a vessel equipped with a device for withdrawing a gas phase and a device for withdrawing a liquid phase.

2. The device according to claim 1, wherein the gap-type evaporation chambers are open at the top and bottom but closed at the sides and that a back-flow of a gaseous phase leaving the gap-type evaporation chambers at the top into the lower section of the gap-type evaporation chambers is prevented by a partitioning element arranged between the vessel wall and the stack.

3. The device according to claim 1, wherein the evaporator modules comprise two or more horizontal zones, at least one zone featuring a set of parallel micro-channels and every zone being equipped with separate devices for feeding and withdrawing a heat exchange fluid.

4. The device according to claim 1, wherein at least two stacks are arranged axially or laterally off-set above each other in one or more communicating vessels, the evaporator modules of the lowermost stack featuring a set of parallel micro-channels on at least one side as well as a device for feeding a liquid fluid, and a device for feeding a gas into the gap-type chambers being arranged at the lower end of each stack.

* * * * *